Figure 1:
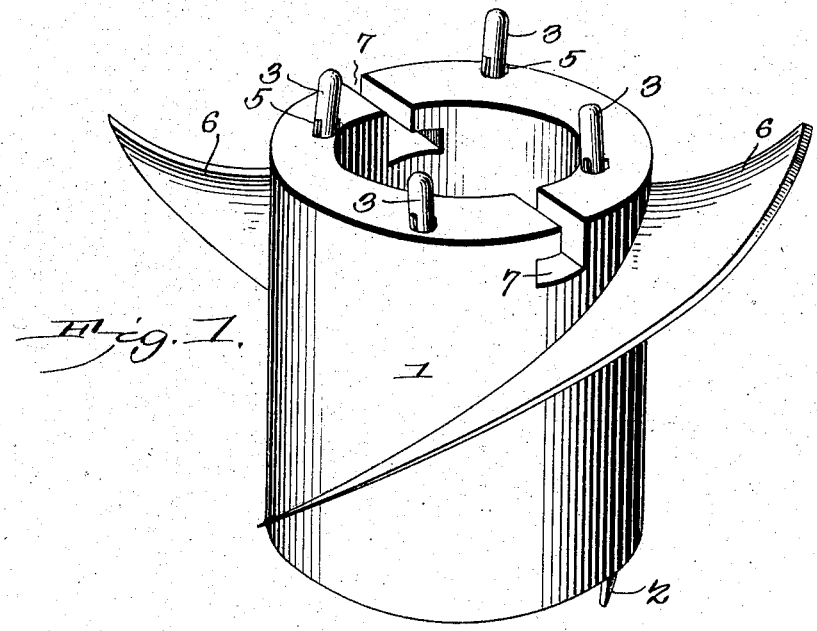

No. 781,346. PATENTED JAN. 31, 1905.
R. D. KLINE.
TRANSPLANTING IMPLEMENT.
APPLICATION FILED AUG. 12, 1904.

3 SHEETS—SHEET 1.

Witnesses:

Rudolph D. Kline,
Inventor,
by C.A. Snow & Co.
Attorneys.

No. 781,346. PATENTED JAN. 31, 1905.
R. D. KLINE.
TRANSPLANTING IMPLEMENT.
APPLICATION FILED AUG. 12, 1904.
3 SHEETS—SHEET 2.
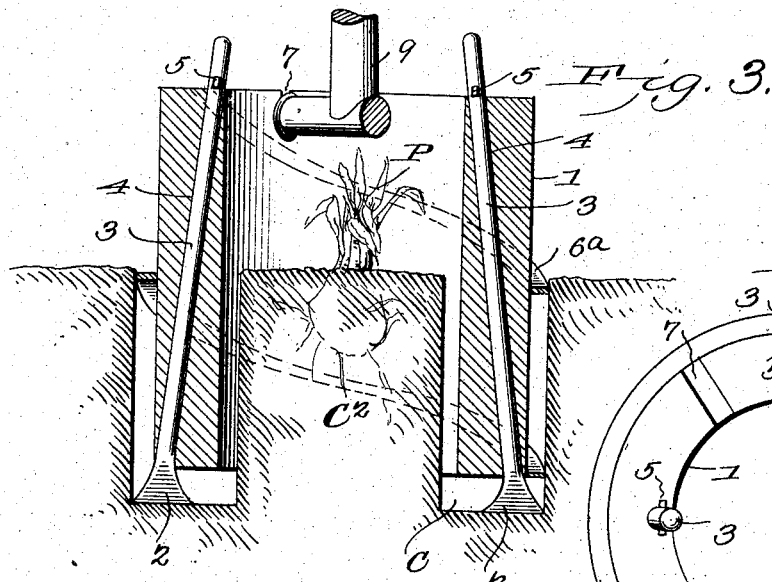
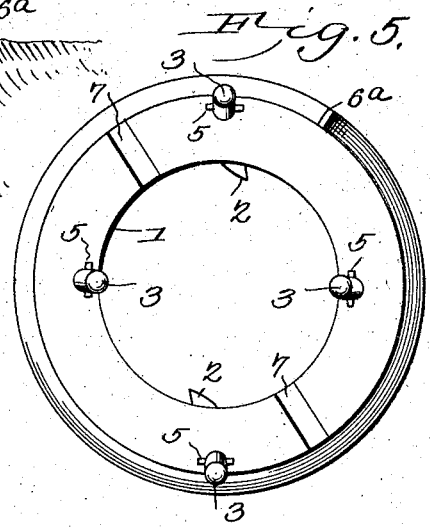
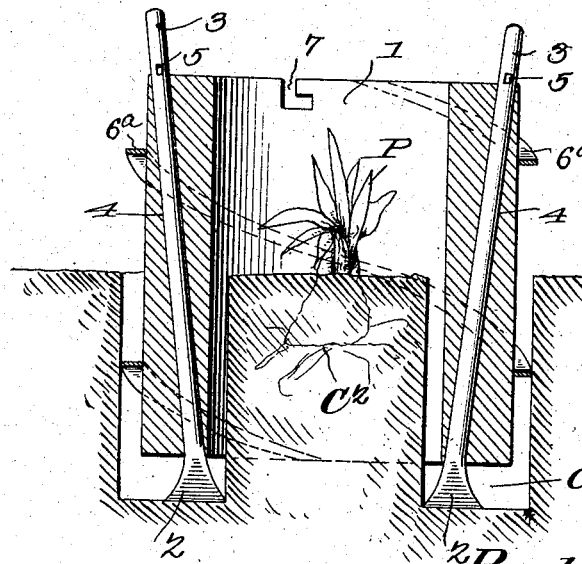
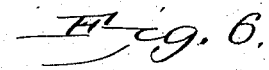
Witnesses:
Rudolph D. Kline,
Inventor,
by C. A. Snow & Co.
Attorneys.

No. 781,346. PATENTED JAN. 31, 1905.
R. D. KLINE.
TRANSPLANTING IMPLEMENT.
APPLICATION FILED AUG. 12, 1904.

3 SHEETS—SHEET 3.

Witnesses:

Rudolph D. Kline,
Inventor,
by C. A. Snow & Co.
Attorneys.

No. 781,346. Patented January 31, 1905.

UNITED STATES PATENT OFFICE.

RUDOLPH D. KLINE, OF STREATOR, ILLINOIS.

TRANSPLANTING IMPLEMENT.

SPECIFICATION forming part of Letters Patent No. 781,346, dated January 31, 1905.

Application filed August 12, 1904. Serial No. 220,522.

*To all whom it may concern:*

Be it known that I, RUDOLPH D. KLINE, a citizen of the United States, residing at Streator, in the county of Lasalle and State of Illinois, have invented a new and useful Transplanting Implement, of which the following is a specification.

This invention relates to transplanting implements.

The implement of the present invention is designed for use more particularly in the transplanting of pie-plants; but it is to be understood that it is equally adaptable for use in connection with any plant to be removed from the earth, and as this will be obvious its adaptation to any kind of plant other than that named is not illustrated.

As is well known, rhubarb, or the so-called "pie-plant," requires peculiar treatment in order to bring it to maturity by artificial means. This peculiarity resides in the fact that the plant must be allowed to "sleep"—that is to say, to be frozen—in order to check its growth and stop all germinating functions before it can be transplanted from the earth to a hot-house; otherwise it will rot, and thus be destroyed. The procedure generally observed by growers of this plant is to allow it to remain in the ground until the first frost in the fall, and when it is thoroughly wilted by frost a trench is dug around the plant, thus to obviate any disturbance to its roots, and the lump or mass of earth inclosing the latter is then bodily removed to a hot-house. While this manner of removing the plant is effective, it is very laborious and expensive and frequently entails loss due to carelessness on the part of the operator in not digging the trench deep enough to prevent injury to the roots of the plant.

It is the object of the present invention in a ready, simple, thoroughly-feasible, and practical manner to simplify the procedure and lessen the labor necessary to remove the plant, positively to obviate danger or damage thereto; to insure its removal from the earth in such manner as to prevent disintegration of the clod or core of earth in which the roots are embedded; to prevent adhesion of frozen or other earth to the implement, and generally to improve the construction and increase the utility of such implements.

The attainment of the above objects may be secured in many ways, and, as herein shown and described, three forms of implements for carrying out the invention are shown, it being understood that the underlying principle common to all may be secured by means other than that shown and still be within the scope of the invention.

With the above and other objects in view, as will appear as the nature of the invention is better understood, the same consists in the novel construction and combination of parts of a transplanting implement, as will be hereinafter fully described and claimed.

Figure 2:
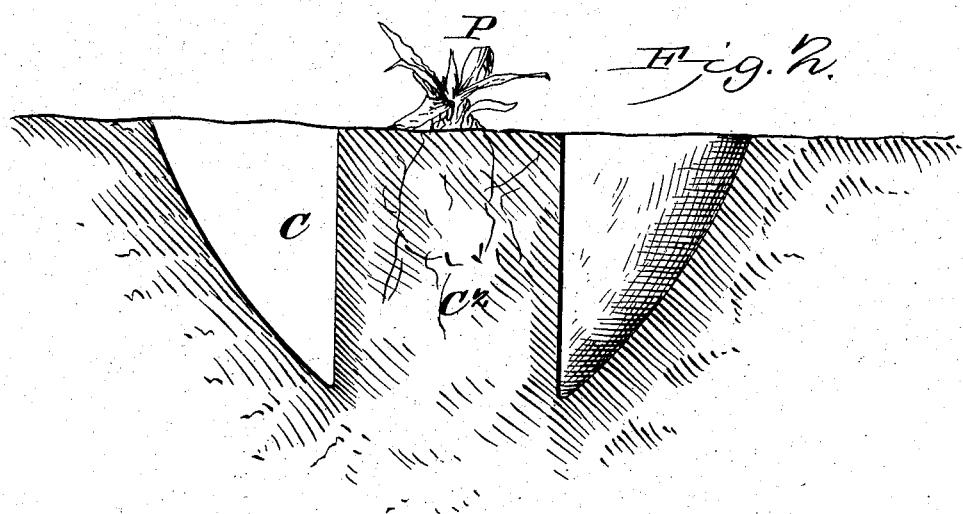
Figure 7:
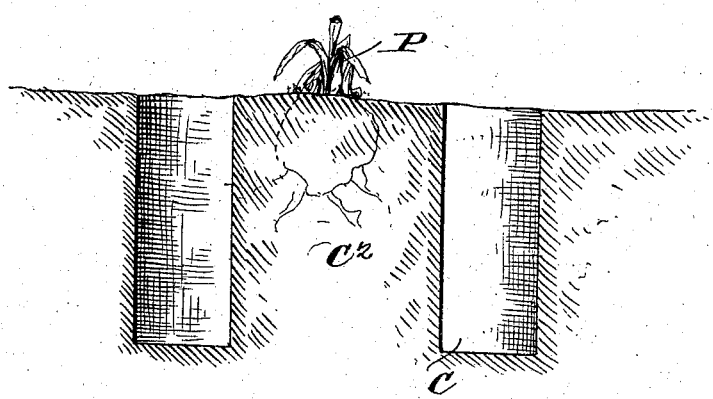
Figure 8:
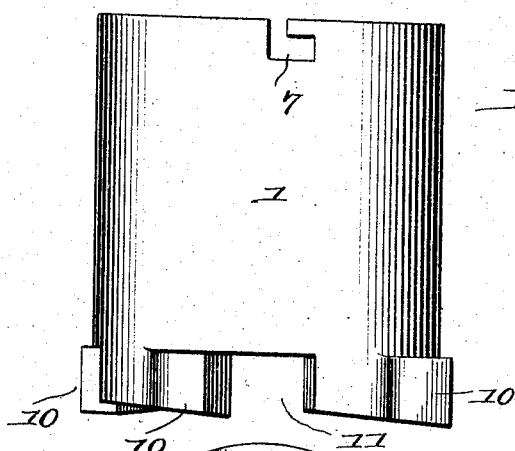
Figure 9:
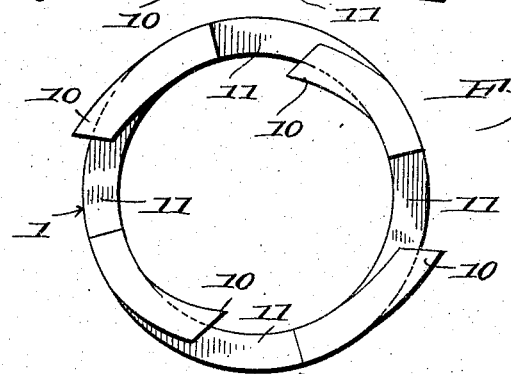

In the accompanying drawings, forming a part of this specification, and in which like characters of reference indicate corresponding parts, Figure 1 is a view in perspective of a preferred form of embodiment of the invention. Fig. 2 is a view in elevation exhibiting the channel formed in the earth and the core left standing thereby, with the plant positioned in the core. Fig. 3 is a view in vertical section through a transplanting implement constructed in accordance with the present invention, the said implement being shown as positioned around a plant to be removed. Fig. 4 is a view similar to Fig. 3, but taken at right angles thereto. Fig. 5 is a view in top plan. Fig. 6 is a detached detail view of one form of operating-handle that may be employed for rotating the implement. Fig. 7 is a view in elevation exhibiting the channel formed in the earth and the core left standing thereby, with the plant positioned in the core. Fig. 8 is a view in side elevation of a modified form of implement. Fig. 9 is an inverted plan view of Fig. 8.

Referring to the drawings and to Fig. 1 thereof, 1 designates the stock of the implement, which is a hollow cylinder, as shown, and may be made of cast iron or steel formed in one piece or may be constructed of a plurality of sections suitably assembled, and as the latter arrangement will be well understood and is a common expedient resorted to in the construction of cylindrical bodies detailed illustration thereof is deemed unnecessary.

The stock has combined with it a plurality of cutting elements, each of which consists of a bit or blade 2 and a shank 3. The manner of combining cutting elements with the stock in this form of embodiment of the invention consists in providing the stock with a plurality of longitudinally-disposed orifices 4, which, as shown in Fig. 5, are consecutively disposed on opposite inclines with relation to each other. The object of this arrangement is to cause the bits of the cutting elements to project alternately beyond the inner and outer wall of the stock, thus to cause them when the stock is rotated to form a channel of greater transverse or horizontal area than that of the wall of the stock, thereby to form a clearance between the inner and outer walls of the stock which will permit the implement to be readily removed without disturbing the core. The shanks of the bits may be held within the orifices in any preferred manner, one means employed (clearly shown in Fig. 1) consisting of wedges 5, which are driven through suitable orifices in the upper ends of the shanks, the under faces of the wedges being disposed to bear upon the upper edge or face of the stock, thus to draw the bit-carrying portion of the shank against the stock and bind it firmly in operative position. Of course, as will be obvious, the upper ends of the shanks may be screw-threaded to receive nuts for locking the shanks in position, and as this will be readily understood illustration thereof is deemed unnecessary. In order to remove the loosened earth from the channel C, there may be combined with the exterior of the stock two spirally-arranged flights 6, which may be integral with the stock or be secured thereto in any suitable manner and extend from its lower to its upper end.

As before stated, it is the object of this invention, among others, to lessen the labor incident to cutting a trench and to prevent adhesion of frozen or other earth to the implement. In Fig. 1 flights are shown as disposed on opposite sides of the stock and as gradually increasing in width from their lower to their upper ends, forming thereby wedge-shaped cutting edges. The flights are also slightly concaved in cross-section, with the bulge downward, and owing to their spiral arrangement they will form a twisted wall to remove the earth in the operation of the implement, which will cause rapid cutting and a movement of the earth toward the stock and which will result in the parts being self-clearing. Under some conditions the flights may be straight in cross-section, and as this will be obvious illustration is omitted. At their point of juncture with the lower end of the stock the flights merge thereinto, thus reducing resistance to initial entry at this point to a minimum. By the gradually-increasing width of the flights from their lower to their upper ends there is sufficient progressive resistance presented to their entrance into the earth to cause the friction that will result to generate a sufficient amount of heat to cause the earth to scour upon the stock and flights, so that any tendency of frozen earth to adhere to these parts is prevented. This form of embodiment is peculiarly adapted for use in ground that is hard frozen, although it is perfectly adapted for use in soft ground. By the disposition of the flights the channel C (shown in Fig. 2) is approximately cone-shaped, while the core $C^2$ is a true cylinder. By having the wall of the channel diverge outward from the bottom upward the removal of the core by crowbar or spade is facilitated, inasmuch as there is a comparatively wide space, which is adapted to permit the removal of the core. A further object for having the flights disposed as shown—that is to say, gradually increasing in horizontal width from their lower to their upper ends—is to loosen the earth to be removed by the implement, thus expediting, simplifying, and reducing the labor of the proceedure. As will be obvious, as the stock is rotated the earth removed by the bits will be carried upward by the flights and deposited adjacent to the channel. The stock may be rotated in any preferred manner either through machine-power or by hand, and in the present instance the latter arrangement is exhibited, more particularly for the purpose of showing one manner in which the device may be successfully utilized. To effect the above result, the upper edge of the stock is provided with two oppositely-alined bayonet-slots 7, which are adapted to be engaged by arms 8, carried by a T-shaped handle 9, as clearly shown in Fig. 6. The form of handle herein shown will be thoroughly effective for the purpose designed; but any other form of device capable of securing the objects sought may be employed in lieu thereof.

In the form of embodiment of the invention shown in Figs. 3 to 7 the construction of the stock, cutting elements, and other parts are the same as those shown in Fig. 1, the only difference being that the flight $6^a$ is continuous and extends from the top to the bottom of the stock and is of the same width throughout, forming thereby a channel, such as shown in Fig. 7—that is, with the walls vertical. Of course two flights may be employed, as shown in Fig. 1, as will be obvious. This form of embodiment of the invention is more particularly adapted for use where the ground is soft, although it may be used in connection with hard or frozen ground.

In the form of embodiment of the invention shown in Figs. 8 and 9 the bits 10 are formed by severing circumferential lengths from the bottom of the stock and bending these alternately inward and outward, a portion of each cutting element thus formed being removed to form dirt-escape openings 11, as clearly shown in Fig. 9. Where the stock is made of wrought iron or steel, the cutting elements may be formed in the manner above described; but where made of cast steel or iron they will be formed in this manner on the pattern. The flights are not shown in connection with the implement shown in Figs. 8 and 9; but it is to be understood that, if preferred, they may be combined therewith, and as this will be readily apparent illustration thereof is omitted.

In the use of the implement the stock is placed over the plant P, care being taken to see that the plant is centrally disposed with relation to the bore of the stock, thus to prevent any damage to the roots. As before stated, the transplanting of the plant is effected after it has been frozen, and the channel C may be formed at the time the plant is to be removed and while the ground is frozen or may be formed when the ground is soft and the plant allowed to remain until frozen. The stock being thus positioned, upon rotary motion being imparted thereto the bits 2 in the form of the invention shown in Figs. 1, 3, and 4 and the bits 10 in the form shown in Figs. 8 and 9 cut a circular channel around the plant, the disposition of the cutting elements, as before pointed out, being such as to cause the channel to be of greater cross-area than the thickness of the wall of the stock, thus leaving a sufficient clearance to permit the stock to be readily removed when it has sunk to a proper depth. When the core $C^2$ is to be removed, a spade or other suitable tool, such as a crowbar, is forced under the base of the core and will cause its separation, whereupon the plant and the core may be bodily removed to a suitable hothouse or other forcing-apartment.

While the devices herein shown are exceedingly simple in construction, they will be found of the highest efficiency and durability in use and may be relied upon under all conditions for doing effective and rapid work.

Having thus fully described the invention, what is claimed is—

1. An implement of the class described embodying a hollow stock, and core-forming means disposed to leave a clearance between the inner wall of the stock and the core.

2. An implement of the class described comprising a hollow stock, and core-forming means disposed to leave a clearance between the earth and the inner and outer walls of the stock.

3. An implement of the class described embodying core-forming and earth-lifting means.

4. An implement of the class described comprising a hollow stock, cutting elements projecting beyond the inner and outer walls thereof, and earth-lifting means disposed exteriorly of the stock.

5. An implement of the class described comprising a hollow stock, and cutting elements disposed to form a core of less cross-diameter than that of the bore of the stock.

6. An implement of the class described comprising a hollow stock, and cutting elements disposed to form a core of less cross-diameter than that of the bore of the stock, and a channel of greater cross area than the external diameter of the stock.

7. An implement of the class described comprising a hollow stock, core-forming means disposed to leave a clearance between the earth and the outer walls of the stock, and means for actuating the implement.

8. An implement of the class described comprising a hollow stock, core-forming means disposed to leave a clearance between the earth and the outer walls of the stock, and detachable means for actuating the implement.

9. An implement of the class described comprising a hollow stock, detachable cutting elements projecting beyond the inner and outer walls thereof, and earth-lifting means disposed exteriorly of the stock.

10. An implement of the class described comprising a hollow stock, detachable cutting elements projecting beyond the inner and outer walls thereof, and earth-lifting means disposed exteriorly of the stock and extending from its bottom to its top.

11. An implement of the class described comprising a hollow stock, cutting elements projecting beyond the inner and outer walls thereof, and a spiral flight disposed exteriorly of the stock.

12. An implement of the class described comprising a hollow stock, cutting elements projecting beyond the inner and outer walls thereof, and spirally-arranged flights disposed exteriorly of the stock and increasing in width from their lower to their upper ends.

13. An implement of the class described comprising a hollow stock, cutting elements disposed at the lower end thereof, and concave spiral flights disposed exteriorly of the stock and increasing in width from their lower to their upper ends.

14. An implement of the class described comprising a hollow stock provided with longitudinal orifices, and cutting elements having shanks disposed within the orifices.

15. An implement of the class described comprising a hollow stock provided with angularly-disposed longitudinal orifices, and cutting elements having shanks arranged within the orifices.

16. An implement of the class described comprising a hollow stock provided with angularly-disposed longitudinal orifices alternate pairs of which are pitched in the same direction, and cutting elements having shanks disposed within the orifices.

17. An implement of the class described comprising a hollow stock provided with longitudinal orifices, cutting elements having shanks disposed within the orifices, and means for locking the shanks in position.

18. An implement of the class described comprising a stock provided with oppositely-disposed slots and with cutting elements, and an operating-handle having arms to engage the slot.

19. An implement of the class described comprising a stock provided in its upper edge with oppositely-disposed bayonet-slots, cutting elements, and an operating-handle having arms to engage the slots.

20. An implement of the class described, comprising a stock, cutting elements carried thereby, and combined cutting and lifting devices associated with the stock.

In testimony that I claim the foregoing as my own I have hereto affixed my signature in the presence of two witnesses.

RUDOLPH D. KLINE.

Witnesses:
J. M. McDONALD,
O. A. ROLSTON.